United States Patent
Shveidel et al.

(10) Patent No.: US 10,949,265 B2
(45) Date of Patent: Mar. 16, 2021

(54) REPEATABLE BARRIER SYNCHRONIZATION OBJECT

(71) Applicant: EMC IP Holding Company LLC, Hopkinton, MA (US)

(72) Inventors: Vladimir Shveidel, Pardes-Hana (IL); Lior Kamran, Pishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 179 days.

(21) Appl. No.: 16/261,162

(22) Filed: Jan. 29, 2019

(65) Prior Publication Data

US 2020/0241933 A1 Jul. 30, 2020

(51) Int. Cl.
  *G06F 3/06* (2006.01)
  *G06F 9/52* (2006.01)
  *G06F 9/54* (2006.01)

(52) U.S. Cl.
  CPC .............. *G06F 9/522* (2013.01); *G06F 3/061* (2013.01); *G06F 3/067* (2013.01); *G06F 3/0631* (2013.01); *G06F 9/542* (2013.01); *G06F 9/546* (2013.01)

(58) Field of Classification Search
  CPC ........ G06F 9/522; G06F 3/061; G06F 3/0631; G06F 3/067; G06F 9/542; G06F 9/546
  See application file for complete search history.

(56) References Cited

U.S. PATENT DOCUMENTS

| 7,363,431 B1 * | 4/2008 | Niver | H04L 67/1095 |
| | | | 707/999.201 |
| 8,082,424 B2 * | 12/2011 | Blocksome | G06F 9/522 |
| | | | 712/220 |
| 2020/0174931 A1 * | 6/2020 | Williams | G06F 9/522 |

* cited by examiner

*Primary Examiner* — Emerson C Puente
*Assistant Examiner* — Jonathan R Labud
(74) *Attorney, Agent, or Firm* — Daly, Crowley Mofford & Durkee, LLP (57) ABSTRACT

A method is disclosed comprising: detecting an event that is generated within a storage system; identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function; calling the respective set function of each of the barrier objects; calling the respective wait function of each of the barrier objects, wherein at least one of the respective wait functions is called before another one of the respective wait functions has returned; reconfiguring the storage system after all of the respective wait functions have returned; and calling the respective release function of each of the barrier objects.

14 Claims, 8 Drawing Sheets

REPEATABLE BARRIER SYNCHRONIZATION OBJECT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage system is disclosed, comprising: detecting an event that is generated within the storage system; identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function; calling the respective set function of each of the barrier objects; calling the respective wait function of each of the barrier objects, wherein at least one of the respective wait functions is called before another one of the respective wait functions has returned; reconfiguring the storage system after all of the respective wait functions have returned; and calling the respective release function of each of the barrier objects.

According to aspects of the disclosure, a system is disclosed comprising: a memory; and one or more processors operatively coupled to the memory, the one or more processors being configured to perform the operations of: detecting an event that is generated within a storage system; identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function; calling the respective set function of each of the barrier objects; calling the respective wait function of each of the barrier objects, wherein at least one of the respective wait functions is called before another one of the respective wait functions has returned; reconfiguring the storage system after all of the respective wait functions have returned; and calling the respective release function of each of the barrier objects.

According to aspects of the disclosure, a non-transitory computer-readable medium is disclosed that is configured to store one or more processor-executable instructions, which when executed by one or more processors cause the one or more processors to perform the operations of: detecting an event that is generated within a storage system; identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function; calling the respective set function of each of the barrier objects; calling the respective wait function of each of the barrier objects, wherein at least one of the respective wait functions is called before another one of the respective wait functions has returned; reconfiguring the storage system after all of the respective wait functions have returned; and calling the respective release function of each of the barrier objects.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
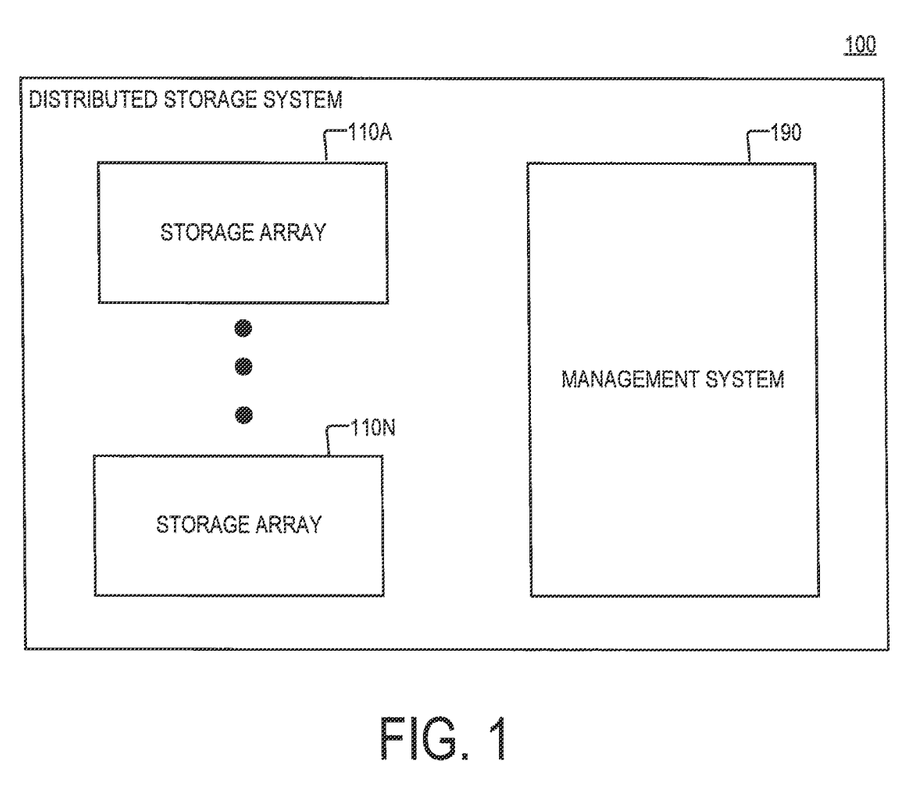
FIG. 1 is a diagram of an example of a distributed storage system, according to aspects of the disclosure.
Figure 2:
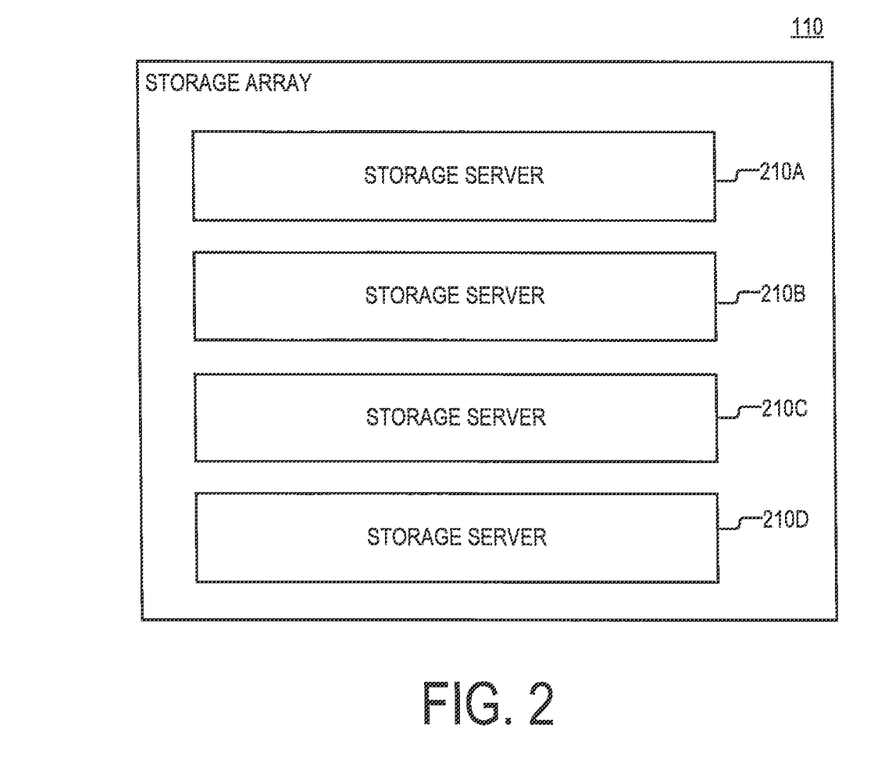
FIG. 2 is a diagram of an example of a storage array that is part of the storage system of FIG. 1, according to aspects of the disclosure.

FIG. 1 is a diagram of an example of a storage system 100, according to aspects of the disclosure. The storage system 100 may include a content-based storage system and/or any other suitable type of distributed storage system. As illustrated, the storage system 100 may include one or more storage arrays 110 and a management system 190. The operation of the storage arrays 110 and the management system 190 is discussed further below with respect to FIGS. 2-8. FIG. 2 is a diagram a storage array 110 that is part of the storage system 100, according to aspects of the disclosure. The storage array 110 may include a plurality of storage servers 210 that are coupled to one another in a network (e.g., a mesh network). The network may include an InfiniBand network, a TCP/IP network, and/or any other suitable type of network.

Figure 3:
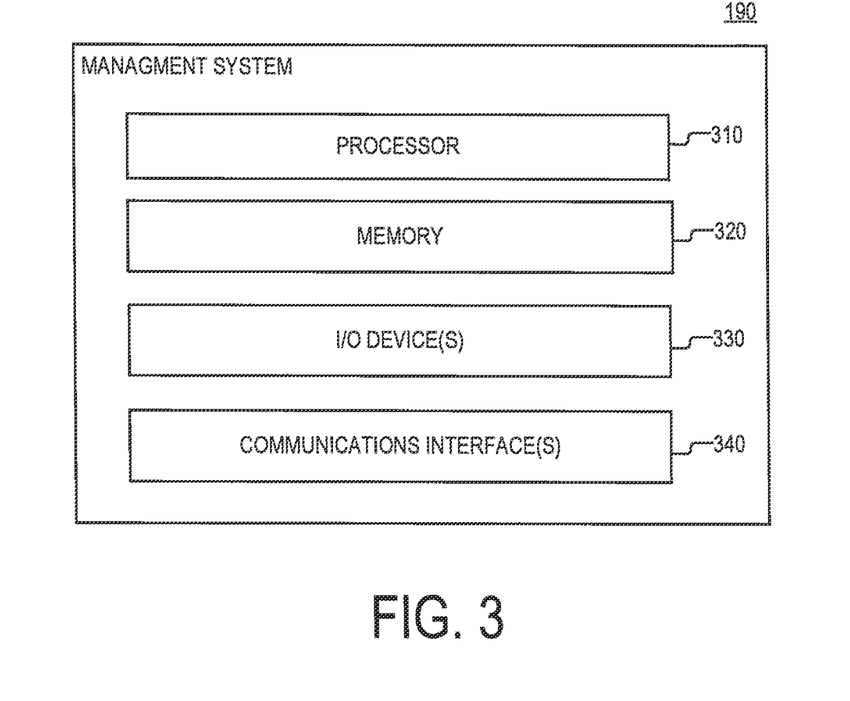
FIG. 3 is a diagram of an example of a management system that is part of the storage system of FIG. 1, according to aspects of the disclosure.

FIG. 3 is a diagram of an example of the management system 190, according to aspects of the disclosure. As illustrated, the management system 190 may include one or more processors 310, a memory 320, 110 device(s) 330, and communications interface(s) 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 330 may include any suitable type of input and/or output device, such as one or more mice, one or more keyboards, one or more microphones, or one more display screens, for example. The communications interface(s) 340 may include any suitable type of communications interface, such as one or more Ethernet adapters, one or more Wi-Fi adapters (e.g., 802.1414 adapters), and one or more Long-Term Evolution (LTE) adapters, for example.

Figure 4:
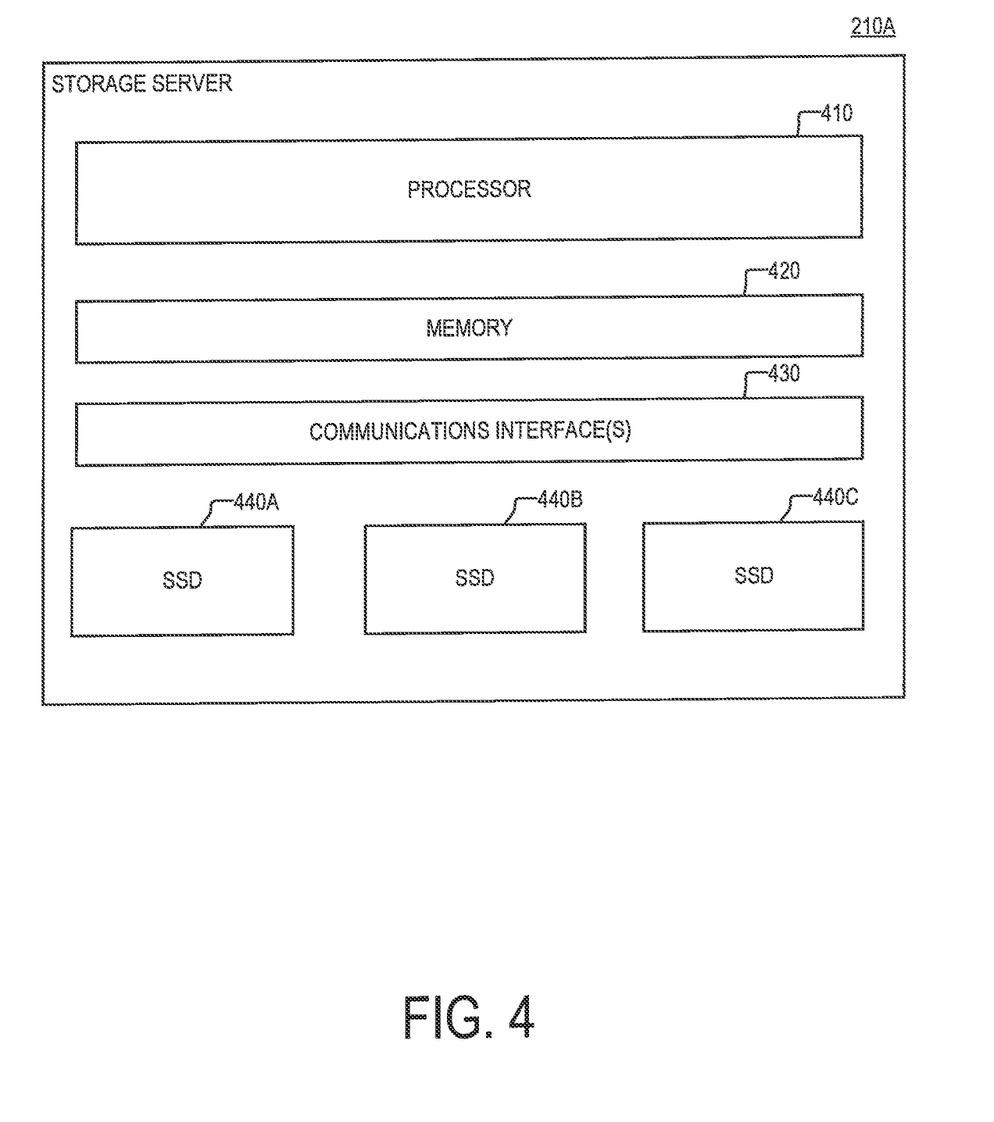
FIG. 4 is a diagram of an example of a storage server that is part of the storage system of FIG. 1, according to aspects of the disclosure.

FIG. 4 is a diagram of an example of the storage server 210A, according to aspects of the disclosure. As illustrated, the storage server 210 may include a processor 410, a memory 420, a communications interface(s) 430, and a plurality of storage devices that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 420 may include any suitable type of volatile and/or nonvolatile memory. In some implementations, the memory 420 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 430 may include any suitable type of communications interface, such as one or more Ethernet adapters, one or more Wi-Fi adapters (e.g., 802.1414 adapters), and one or more Long-Tem Evolution (LTE) adapters, for example. In the present example, the storage devices 440 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

Consider a distributed storage system with nodes that are connected in a full-mesh network, managed by a system manager.

Figure 5:
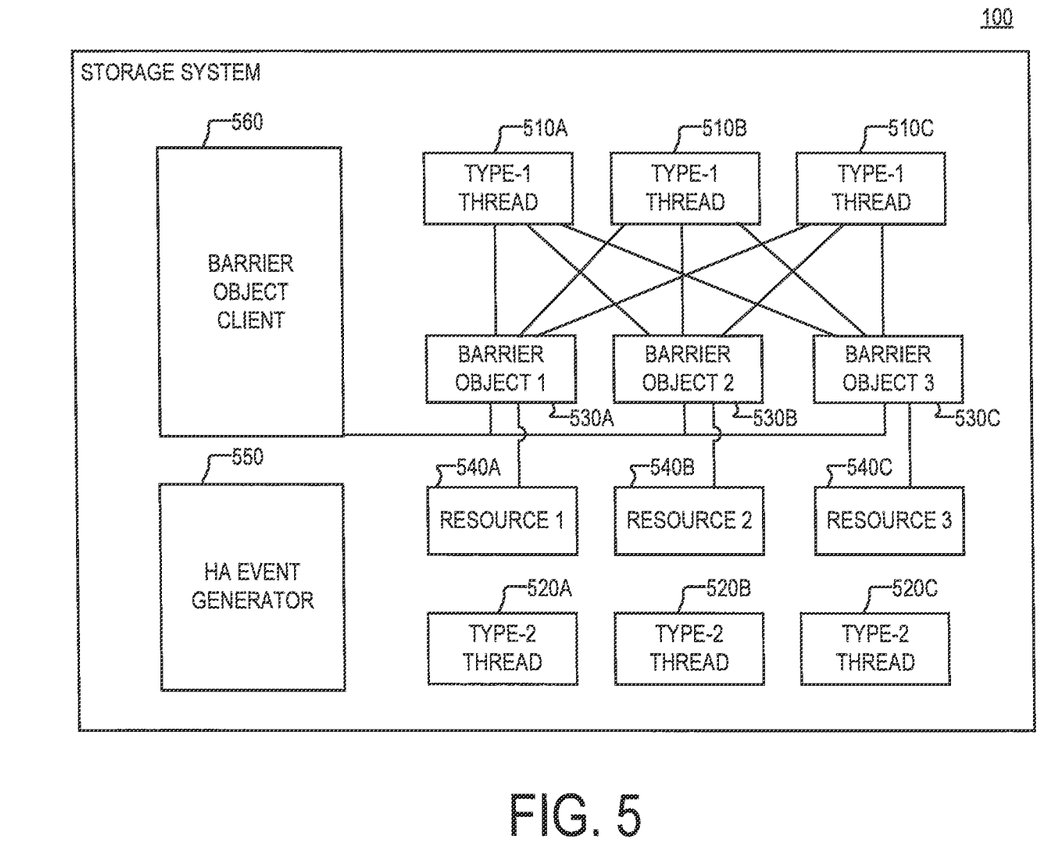
FIG. 5 is a diagram illustrating the operation of the storage system of FIG. 1, according to aspects of the disclosure.

FIG. 5 is a schematic diagram illustrating the operation of the storage system 100, in accordance with one implementation. As illustrated, the storage system may be configured to execute a plurality of type-1 threads 510, a plurality of type-2 threads, a plurality of barrier objects 530, a plurality of resources 540, an event generator 550, and a client 560.

The threads 510 may include any suitable type of thread that is configured to access one or more of the resources 540. The threads 520 may also include any suitable type of thread. However, in some implementations, the threads 510 and the threads 520 may be mutually exclusive. For example, thread 520A may be executed by the client 560 only when none of the threads 510A-C is accessing the resource 540A; thread 520B may be executed by the client 560 only when none of the threads 510A-C is accessing the resource 540B; and thread 520C may be executed by the client 560 only when none of the threads 510A-C is accessing the resource 540C. The threads 510 and 520 may be executed on one of servers 210 of the storage system. Any of the threads 510 and 520 may be executed on the same server 210 (e.g., by the same processor) or on different servers 210 (e.g., by different processors)

The resources 540 may include any suitable hardware or software resource of the storage system 100. Examples of software resources may include file system journals, databases and/or any other suitable type of data structure. Examples of hardware resources may include one or more SSDs, one or more communications interface(s), one or more communications bus(es), and/or any other suitable type of hardware resource. According to the present example, each of the resources 540 may include a different file system journal of the storage system 100.

The event generator 550 may include one or more processor-executable instructions that are configured to generate high-availability (HA) events. The HA events may include any suitable type of event that is generated in the storage system 100, which triggers the suspension and/or execution of one or more threads within the storage system 100. Examples of HA events may include process-restart events that are generated after a process failure in the storage system 100, events that are generated when a failed node is removed from the system 100, events that are generated when a new node is added to the storage system 100, and/or any other suitable type of event. According to the present example, the event generator 550 is executed on the management system 190. However alternative implementations are possible in which the event generator 550 is executed on another node of the storage system 100. Although in the present example the event generator 550 is implemented in software, it will be understood that alternative implementations are possible in which the event generator 550 is implemented in hardware or as a combination of software and hardware.

The client 560 may include one or more processor-executable instructions that are configured to detect HA events and process the detected HA events. More particularly, the client may interact with the barrier object 530 based on detected HA events to synchronize the execution of the threads 510 and 520. In some implementations, the client 560 may be configured to execute processes 800-900, which are discussed further below with respect to FIGS. 8-9. According to the present example, the client 560 is executed on the management system 190. However alternative implementations are possible in which the client 560 is executed on another node of the storage system 100. Although in the present example the client 560 is implemented in software, it will be understood that alternative implementations are possible in which the client is implemented in hardware or as a combination of software and hardware.

According to aspects of the disclosure, each of the threads 510 may include one or more critical sections. A critical section, according to the present example, may include one or more processor-executable instructions that are configured to access one of the shared resources 540. At the beginning of each critical section, the ENTER function of one of the barrier objects 530 may be called, and at the end of the critical section, the EXIT function of the same barrier object 530 may be called. In other words, each critical section in the threads 510 may be delineated by calls to the ENTER and EXIT functions of the same barrier object. As used throughout the disclosure, the term "critical section" is used synonymously with the term "flow."

Figure 6:
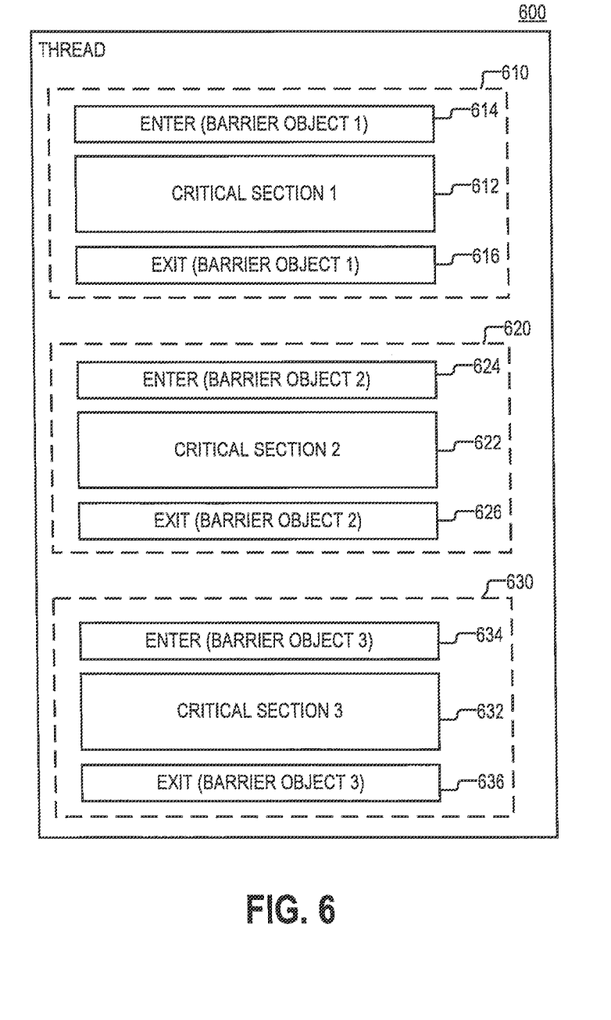
FIG. 6 is a diagram of an example of a thread that is executed in the storage system of FIG. 1, according to aspects of the disclosure.

FIG. 6 shows an example of a thread 600, according to aspects of the disclosure. The thread 600 may be the same or similar to any of the threads 510A-C. As illustrated, the thread 600 may include a plurality of portions 610, 620, and 630. Portion 610 includes a critical section 612 that contains one or more processor-executable instructions that are configured to access the resource 540A. A call 614 to the ENTER function of barrier object 530A is placed before the beginning of the critical section 612, and a call 616 to the EXIT function of the barrier object 530A is placed after the end of the critical section 612. Portion 620 includes a critical section 622 that contains one or more processor-executable instructions that are configured to access the resource 540B. A call 624 to the ENTER function of barrier object 530B is placed before the beginning of the critical section 622, and a call 626 to the EXIT function of the barrier object 530B is placed after the end of the critical section 622. Portion 630 includes a critical section 632 that contains one or more processor-executable instructions that are configured to access the resource 540C. A call 634 to the ENTER function of barrier object 530C is placed before the beginning of the critical section 632, and a call 636 to the EXIT function of the barrier object 530C is placed after the end of the critical section 632.

Returning to FIG. 5, each of the barrier objects 530 may implement a respective software barrier. The software barrier may have at least two states—namely a "set" state and a "released" state. The barrier implemented by any of the barrier objects 530 may be set by calling a BARRIER_SET function of this object. The barrier associated with any of the barrier objects 530 may be released by calling a BARRIER_RELEASE function of that object. According to the present example, the BARRIER_SET and BARRIER_RELEASE functions are called by the client 560 in response to HA events that are generated by the event generator 550. When a flow in any of the threads 510 calls the ENTER function of one of the barrier objects 530, the flow may either enter the barrier associated with that barrier object 530 or be suspended. When the ENTER function is called while the barrier is released, the flow (or its thread) may begin executing, and it is considered to be "inside the barrier." When the ENTER function is called while the barrier is set, the flow (or its thread) may be suspended until the barrier is released (e.g., by the client 560 and/or a scheduler of the storage system 100), and is considered "outside of the barrier." After the barrier is released, any flows (or their threads) that have been suspended upon calling the ENTER function can be resumed.

According to the present example, access to the resource 540A is controlled by the barrier object 530A; access to the resource 540B is controlled by the barrier object 530B; and access to the resource 540C is controlled by the barrier object 530C. When one or more HA events are generated by the event generator HA 450, the client 560 may interact with the barrier objects 530 to lock the resources 540 for the threads 510. While the resources 540 are being locked, one or more of the threads 520 may wait to be executed. After the locking of the resources 540 is completed, the waiting threads 520 may be executed (e.g., by the client 560 and/or a scheduler of the storage system 100).

In some implementations, the client 560 may lock the resource 540A (for access by the threads 510) by executing a two-step sequence involving the barrier object 530A: first, the client 560 may call the BARRIER_SET function of the barrier object 530A to prevent new flows from entering the respective barrier of the barrier object 530A, and then the client may call a BARRIER_WAIT function of the barrier object 530A. The BARRIER_WAIT function of the barrier object 530A may return after all flows that are currently inside the barrier of the barrier object 530A have exited the barrier (e.g., by calling the EXIT function of the barrier object 530A). In other words, the BARRIER function may return after a certain time delay has passed since it was called. After the BARRIER_WAIT function has returned, the barrier object 530A (or the resource 540A) is considered locked for access by the threads 510, and one or more of the threads 520 may be executed. After the threads 520 have finished executing, the client 560 may release the barrier of the barrier object 530A by calling the BARRIER_RELEASE function of the barrier object 530A.

The client 560 may lock the resource 540B (for access by the threads 510) by executing a two-step sequence involving the barrier object 530B: first, the client 560 may call the BARRIER_SET function of the barrier object 530E to prevent new flows from entering the respective barrier of the barrier object 530B, and then the client may call a BARRIER_WAIT function of the barrier object 530B, The BARRIER_WAIT function of the barrier object 530B may return after all flows that are currently inside the barrier of the barrier object 530B have exited the barrier (e.g., by calling the EXIT function of the barrier object 530B). In other words, the BARRIER function may return after a certain time delay has passed since it was called. After the BARRIER_WAIT function has returned, the barrier object 530B (and/or the resource 540B) is considered locked for access by the threads 510, and one or more of the threads 520 may be executed. After the threads 520 have finished executing, the client 560 may release the barrier of the barrier object 530B by calling the BARRIER_RELEASE function of the barrier object 530B.

The client 560 may lock the resource 540C (for access by the threads 510) by executing a two-step sequence involving the barrier object 530C: first, the client 560 may call the BARRIER_SET function of the barrier object 530C to prevent new flows from entering the respective barrier of the barrier object 530C, and then the client may call a BARRIER_WAIT function of the barrier object 530C. The BARRIER_WAIT function of the barrier object 530C may return after all flows that are currently inside the barrier of the barrier object 530C have exited the barrier (e.g., by calling the EXIT function of the barrier object 530C). In other words, the BARRIER_WAIT function may return after a certain time delay has passed that is based on the time it takes for all flows that are currently inside the barrier of the barrier object 530C to exit the barrier. After the BARRIER_WAIT function has returned, the object 530C (or the resource 540C) is considered locked for access by the threads 510, and one or more of the threads 520 may be executed. After the threads 520 have finished executing, the client 560 may release the barrier of the barrier object 530C by calling the BARRIER_RELEASE function of the barrier object 530C.

Figure 7:
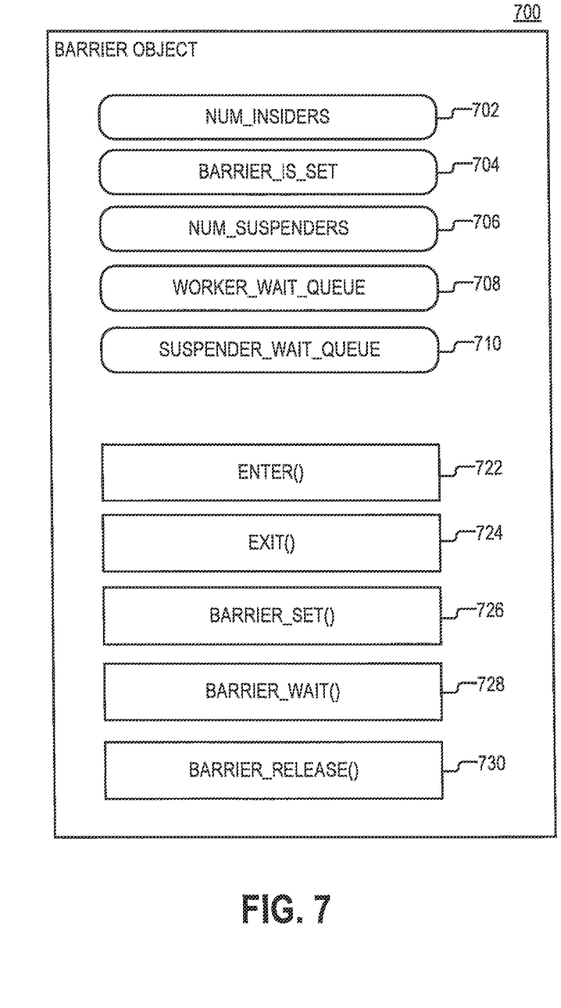
FIG. 7 is a diagram of an example of a barrier object that is executed by the storage system of FIG. 1, according to aspects of the disclosure.

FIG. 7 is a diagram of an example of a barrier object 700, according to aspects of the disclosure. The barrier object 700 may be the same or similar to any of the barrier objects 530A-C. In some implementations, the barrier object 700 may include member variables 702-710 and member functions 722-730.

Variable 702 (NUM_INSIDERS) may be a counter variable that identifies the total count of flows that are currently inside the barrier implemented by the barrier object 700. When member function 722 (ENTER) is called by a thread 510, while the barrier is released, variable 702 may be incremented. When member function 722 (ENTER) is called by a thread 510, while the barrier is set, variable 702 may be left unchanged, and the thread 510 may be suspended. When member function 724 (EXIT) is called by a thread 510, variable 702 may be decremented.

Variable 704 (BARRIER_IS_SET) may be a flag variable that indicates whether the barrier implemented by the barrier object 700 is set. When the barrier is set, variable 704 may have a first value, and when the barrier is released, variable 704 may have a second value.

Variable 706 (NUM_SUSPENDERS) may be a counter variable that identifies a total count of unprocessed HA events generated within the system. When member function 722 (BARRIER_SET) is called by a thread 510, variable 706 may be incremented. When member function 730 (BARRIER_RELEASE) is called, variable 706 may be decremented. In some implementations, the barrier implemented by the barrier object 700 may be released only when the value of variable 706 becomes zero after variable 706 is decremented.

Variable 708 (WORKERS_WAIT_QUEUE) may be a waiting queue where identifiers are stored for threads 510 that attempt to enter the barrier implemented by the barrier object 700 while the barrier is set. In other words, variable 708 (WORKERS_WAIT_QUEUE) may identify one or more threads 510 that are waiting for the barrier to be released. When a thread 510 calls the member function 722 (ENTER), while the barrier is set, the thread 510 may be suspended, and an identifier corresponding to the thread 510 may be added to the waiting queue.

Variable 710 (SUSPENDER_WAIT_QUEUE) may be a queue where identifiers are stored for threads 520 that are waiting for all flows inside the barrier implemented by the barrier object 700 to exit before the barrier is set. In other words, variable 710 (SUSPENDER_WAIT_QUEUE) may identify one or more threads 520 that are waiting for all flows (in the threads 510) to exit the barrier. After the flows have exited, the barrier may be transitioned from the "released" state to the "set" state, and the threads 520 that are waiting in the queue may be executed.

Member function 722 (ENTER) may be invoked before a particular flow is executed. Executing the member function 722, while the barrier implemented by the barrier object 700 is set, may cause the thread calling the member function 722 to be suspended (e.g., by the client 560 and/or a scheduler of the storage system 100), and an identifier corresponding to the thread to be added to variable 708 (WORKER_WAIT_QUEUE).

Member function 724 (EXIT) may be invoked after a particular flow has finished executing. The member function 724 may be configured to decrement variable 702 (NUM_INSIDERS) when invoked.

Member function 726 (BARRIER_SET) may prevent threads that subsequently call member function 722 (ENTER) from entering the barrier implemented by the barrier object 700. The member function 724 may be configured to transition the barrier object 700 from the "released" state to the "set" state by changing the value of variable 704 (BARRIER_IS_SET) to indicate that the barrier implemented by the barrier object 700 has been set. The member function 724 may be further configured to increment the value of variable 706 (NUM_SUSPENDERS) when called.

Member function 728 (BARRIER_WAIT) may be called in order to wait for all threads (or flows thereof) that are inside the barrier implemented by the barrier object 700 to exit. After member function 728 returns, it is guaranteed that there are no more threads remaining inside the barrier. Member function 728 may be configured to return only when there are no more threads (or flows thereof) inside the barrier.

Member function 728 (BARRIER_RELEASE) may be configured to decrement the value of variable 706 (NUM_SUSPENDERS) by 1. Furthermore, after decrementing the value of variable 706, member function 728 may determine whether the value of variable 706 is equal to zero. If the value of variable 706 is equal to zero, member function 728 may: (i) transition the barrier object 700 from the "set" state to the "released" state by changing the value of variable 704 (BARRIER_IS_SET) to indicate that the barrier has been released, and (ii) release any threads 510 that are waiting in variable 708 (WORKER_WAIT_QUEUE). Releasing any of the threads 510 from variable 708 may include removing an identifier corresponding to the thread 510 from the variable 708, and causing the client 560 (or a scheduler of the storage system 100) to execute the thread 510.

Figure 8:
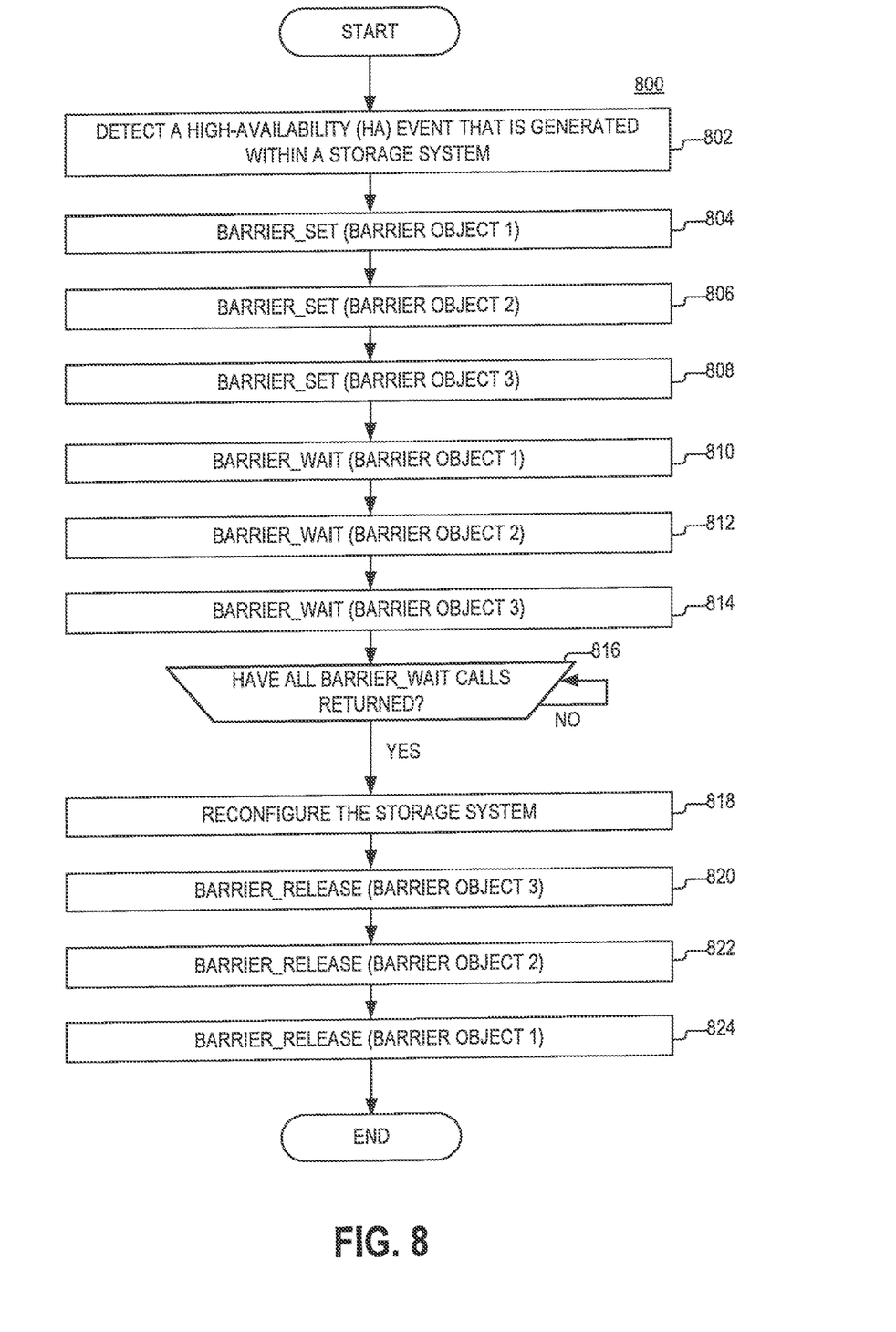
FIG. 8 is a flowchart of an example of a process, according to aspects of the disclosure.

FIG. 8 is a flowchart of an example of a process 800 for reconfiguring the storage system 100, according to aspects of the disclosure. At step 802, the client 560 detects that an HA is generated by the event generator 550. In some implementations, the HA event may be generated when a node, on which a portion of a journal is stored, fails. At step 804, the client 560 calls the BARRIER_SET function of the barrier object 530A. At step 806, the client 560 calls the BARRIER_SET function of the barrier object 530B. At step 808, the client 560 calls the BARRIER_SET function of the bather object 530C. At step 810, the client 560 calls the BARRIER_WAIT function of the barrier object 530A. At step 812, the client 560 calls the BARRIER_WAIT function of the barrier object 530B. At step 814, the client 560 calls the BARRIER_WAIT function of the barrier object 530C. In some implementations, the BARRIER_WAIT function of the barrier object 530C may be called before any of the calls to the BARRIER_WAIT functions of the objects 530A-B have returned. At step 816, the client 560 detects whether all of the invoked BARRIER_WAIT functions have returned. If all BARRIER_WAIT calls have returned, the process 800 proceeds to step 818. Otherwise, if not all BARRIER_WAIT calls have returned, step 816 is executed again. At step 818, the storage system is reconfigured. According to the present example, reconfiguring the storage system includes re-distributing the journal that is (partially) stored on the failed node among nodes in the storage system 100 that remain active. In some implementations, the journal may be redistributed by executing one or more of the threads 520 that are identified in the SUSPENDER_WAIT_QUEUE of any of the barrier objects 530A-C. At step 820, the client 560 calls the BARRIER_RELEASE function of the bather object 530C. At step 822, the client 560 calls the BARRIER_RELEASE function of the barrier object 530B. At step 824, the client 560 calls the BARRIER_RELEASE function of the barrier object 530A.

One advantage of using the barrier objects 530 for access control is that the barrier objects 530 can be set in parallel. As noted above, the barrier objects 530 employ a two-step mechanism for blocking access to the resources 540, which involves: (i) calling the BARRIER_SET function of each of the barrier objects 530 to prevent new flows from entering the barrier implemented by the object, and (ii) calling the respective BARRIER_WAIT function of each of the bather objects 530 to wait out any flows that are currently inside the barrier implemented by the object. As noted above, after the BARRIER_WAIT function of any of the barrier objects 530 is called some time may pass until all flows inside the barrier of the barrier have exited. Because the BARRIER_WAIT functions of the barrier objects 530A-C are executed in parallel, the total waiting time associated with the barrier objects is equal to waiting time of the BARRIER_WAIT function that takes the longest to complete.

In some respects, the barrier objects 530 may provide an alternative to using conventional R/W locks to synchronize access to the resources 540A-B. One advantage of the of the barrier objects 530A-C over conventional R/W locks is that they can be manipulated in parallel by the client 560, whereas conventional R/W locks cannot. A conventional R/W locks may provide a single LOCK function, which may prevent new flows from accessing a resource associated with the lock, and which may return only when all flows that are currently accessing the resource have finished. In other words, because each LOCK function returns only after all accesses to the LOCK function's respective resource have completed, the time it takes for each LOCK function to return may be roughly equal to the time it takes any of the BARRIER_WAIT functions to return. Thus, if access to each of the resources 540 were controlled via a separate R/W lock, the client 560 would have to make three consecutive calls to the respective LOCK functions of the RW locks. Each subsequent call can be placed only after the previous call has completed. Thus, the total time it would take for the three calls to be completed would be equal to the sum of the execution times of the three LOCK functions, which, in most circumstances, would be longer than the waiting time associated with the BARRIER_WAIT function that takes the longest to complete.

Figure 9:
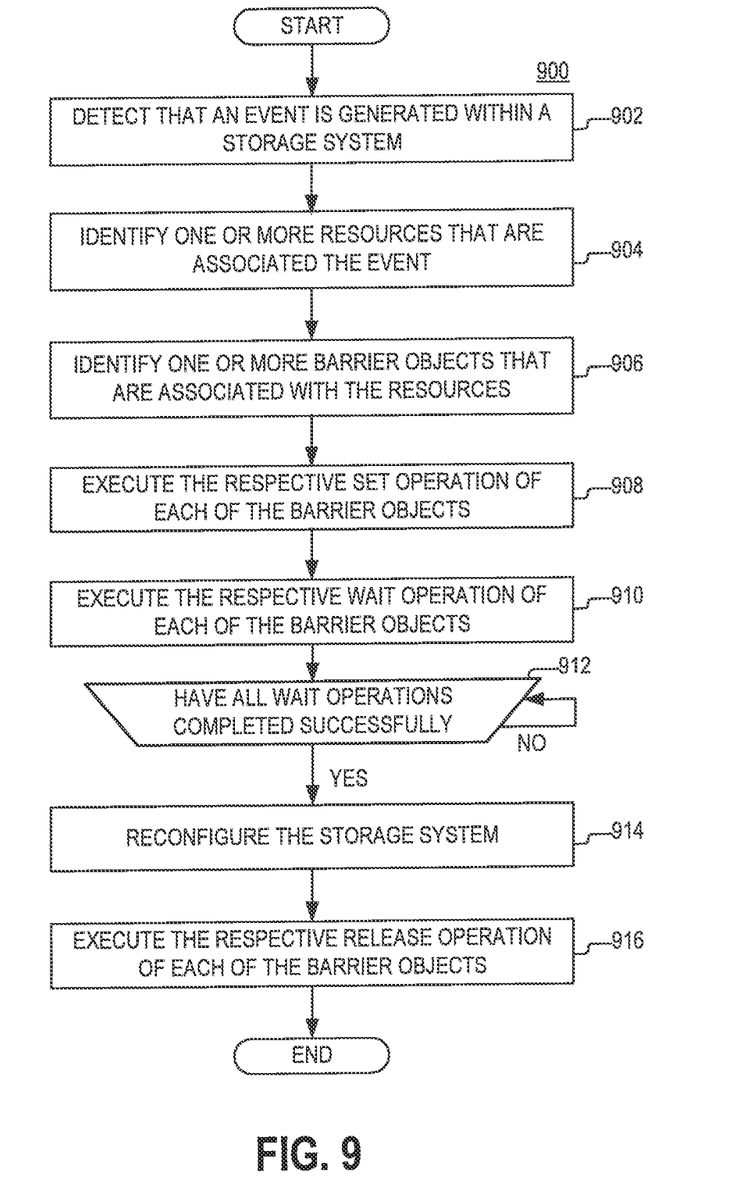
FIG. 9 is a flowchart of an example of a process, according to aspects of the disclosure.

FIG. 9 is a flowchart of an example of a process 900 for reconfiguring a storage system, according to aspects of the disclosure. In some implementations, the storage system may be the same or similar to the storage system 100. In some implementations, the process 900 may be performed by a management system that is part of the storage system and/or any other suitable node of the storage system.

At step 902, the management system detects that an event has been generated within the storage system. The event may be an HA event and/or any other suitable type of event. At step 904, the management system identifies one or more resources of the storage system that are associated with the event. The one or more resources may be identified by using a table that maps each of a plurality of event identifiers to respective identifiers of resources that correspond to the event identifier. The one or more resources associated with the event detected at step 902 may be identified by performing a search of the table using an identifier of the event as a search key.

At step 906, the management system identifies one or more barrier objects. Each of the barrier objects may correspond to one of the resources identified at step 904. Each of the barrier objects may be identified by using a table that maps each of a plurality of resource identifiers to one or more corresponding barrier object identifiers that correspond to the resource identifier. Each of the harrier objects may be identified by performing a search of the table using an identifier of one of the resources identified at step 904 as a search key.

At step 908, the respective BARRIER_SET function of each of the identified barrier objects is called. At step 910, the respective BARRIER_WAIT auction of each of the identified barrier objects is called. At step 912, a determination is made if all calls to BARRIER_WAIT functions have returned. If all calls to the BARRIER_WAIT functions have returned, the process 900 proceeds to step 914. Otherwise, if not all calls to the BARRIER_WAIT functions have returned, step 912 is repeated.

At step 914, the storage system is reconfigured by the management system. Reconfiguring the storage system may include any action that causes the state of the storage system to change. For example, reconfiguring the storage system may include copying data from one node in the storage system to another. As another example, reconfiguring the storage system may include adding or removing a node from the storage system. As yet another example, reconfiguring the storage system may include changing one or more configuration settings of the storage system. It will be understood that the present disclosure is not limited to any specific action for reconfiguring the storage system. In some implementations, the reconfiguration of the storage system may be performed by executing one or more threads in the storage system that are identified in the SUSPENDER_WAIT_QUEUE of any of the barrier objects identified at step 906. At step 916, after the storage system is reconfigured, the management system calls the respective BARRIER_RELEASE function of each of the barrier objects identified at step 906.

According to the present example, the process 900 may be configured to redistribute one or more file system journals within the storage system. For example, a first barrier object may be associated with a first journal (hereinafter "journal A"), a second barrier object may be associated with a second journal (hereinafter "journal B"), and third barrier object may be associated with a third journal (hereinafter "journal C). Each of journals A-C may be distributed over a plurality of nodes of the storage system. When one of the nodes fails, an HA event may be generated, which triggers reconfiguration of the storage system. The reconfiguration of the storage system includes transitioning each of the barrier objects to the "set" state and waiting for all worker threads that are currently accessing the journals to finish. After the working threads are finished, and the barrier objects are set, the responsibility for one or more of journals A-C may be redistributed among the nodes in the storage system 100 that remain active.

FIGS. 1-9 are provided as an example only. At least some of the steps discussed with respect to FIGS. 1-9 may be performed in parallel, in a different order, or altogether omitted. As used in the context of "set function," "wait function," and "release function," the term "function" may refer to one or more processor-executable instructions are configured to perform an operation. Although in one example, the "set function," "wait function," and "release function" may be implemented in software, it will be understood that alternative implementations are possible in which any of these functions may be performed in hardware or as a combination of software and hardware.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
   detecting an event that is generated within the storage system;
   identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function;
   calling the respective set function of each of the barrier objects;
   calling the respective wait function of each of the barrier objects, wherein at least one of the respective wait functions is called before another one of the respective wait functions has returned;
   reconfiguring the storage system after all of the respective wait functions have returned; and calling the respective release function of each of the barrier objects, wherein at least one of the plurality of barrier objects includes: (i) a queue that identifies one or more threads that are executed when the storage system is reconfigured and/or (ii) a counter identifying a count of pending events that are being processed by using the given barrier object, the counter being decremented by the respective release function of the given barrier object when the respective release function of the barrier object is executed.

2. The method of claim 1, wherein the respective set function of any given one of the barrier objects is configured to prevent one or more threads from accessing a resource of the storage system that is associated with the given barrier object.

3. The method of claim 1, wherein the respective release function of any given one of the barrier objects is configured to enable one or more threads to access a resource of the storage system that is associated with the given barrier object.

4. The method of claim 1, wherein the respective wait function of any given one of the barrier objects is configured to return only after a completion of all thread critical sections that are accessing a resource associated with the given barrier object when the respective wait function is called.

5. The method of claim 1, wherein the respective release function of the given barrier object is configured to detect whether the count of pending events is equal to zero after decrementing the counter and, when the counter is equal to zero, transition the given barrier object from a set state to a released state.

6. A system comprising:
a memory; and
one or more processors operatively coupled to the memory, the one or more processors being configured to perform the operations of:
detecting an event that is generated within a storage system;
identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function;
calling the respective set function of each of the barrier objects;
calling the respective wait function of each of the barrier objects, wherein at least one of the respective wait functions is called before another one of the respective wait functions has returned;
reconfiguring the storage system after all of the respective wait functions have returned; and
calling the respective release function of each of the barrier objects,
wherein at least one of the plurality of barrier objects includes: (i) a queue that identifies one or more threads that are executed when the storage system is reconfigured and/or (ii) a counter identifying a count of pending events that are being processed by using the given barrier object, the counter being decremented by the respective release function of the given barrier object when the respective release function of the barrier object is executed.

7. The system of claim 6, wherein the respective set function of any given one of the barrier objects is configured to prevent one or more threads from accessing a resource of the storage system that is associated with the given barrier object.

8. The system of claim 6, wherein the respective release function of any given one of the barrier objects is configured to enable one or more threads to access a resource of the storage system that is associated with the given barrier object.

9. The system of claim 6, wherein the respective wait function of any given one of the barrier objects is configured to return only after a completion of all thread critical sections that are accessing a resource associated with the given barrier object when the respective wait function is called.

10. The system of claim 6, wherein the respective release function of the given barrier object is configured to detect whether the count of pending events is equal to zero after decrementing the counter and, when the counter is equal to zero, transition the given barrier object from a set state to a released state.

11. A non-transitory computer-readable medium storing one or more processor-executable instructions, which when executed by one or more processors cause the one or more processors to perform the operations of:
detecting an event that is generated within a storage system;
identifying a plurality of barrier objects that are associated with the event, each of the plurality of barrier objects being associated with a different respective set function, each of the plurality of barrier objects being associated with a different respective wait function, and each of the plurality of barrier objects being associated with a different respective release function;
calling the respective set function of each of the barrier objects;
calling the respective wait function of each of the barrier objects, wherein at least one of the respective wait functions is called before another one of the respective wait functions has returned;
reconfiguring the storage system after all of the respective wait functions have returned; and
calling the respective release function of each of the barrier objects,
wherein at least one of the plurality of barrier objects includes: (i) a queue that identifies one or more threads that are executed when the storage system is reconfigured and/or (ii) a counter identifying a count of pending events that are being processed by using the given barrier object, the counter being decremented by the respective release function of the given barrier object when the respective release function of the barrier object is executed.

12. The non-transitory computer-readable medium of claim 11, wherein the respective set function of any given one of the barrier objects is configured to prevent one or more threads from accessing a resource of the storage system that is associated with the given barrier object.

13. The non-transitory computer-readable medium of claim 11, wherein the respective release function of any given one of the barrier objects is configured to enable one or more threads to access a resource of the storage system that is associated with the given barrier object.

14. The non-transitory computer-readable medium of claim 11, wherein the respective wait function of any given one of the barrier objects is configured to return only after a completion of all thread critical sections that are accessing a resource associated with the given barrier object when the respective wait function is called.

\* \* \* \* \*